United States Patent
Zander et al.

(10) Patent No.: US 11,489,577 B2
(45) Date of Patent: Nov. 1, 2022

(54) METHODS FOR ESTABLISHING BEAM RECIPROCITY, RELATED WIRELESS DEVICES AND RELATED NETWORK NODES

(71) Applicant: Sony Group Corporation, Tokyo (JP)

(72) Inventors: Olof Zander, Lund (SE); Fredrik Rusek, Esloev (SE); Kun Zhao, Malmö (SE); Erik Bengtsson, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/427,650

(22) PCT Filed: Jan. 14, 2020

(86) PCT No.: PCT/SE2020/050027
§ 371 (c)(1),
(2) Date: Aug. 1, 2021

(87) PCT Pub. No.: WO2020/167194
PCT Pub. Date: Aug. 20, 2020

(65) Prior Publication Data
US 2022/0103220 A1    Mar. 31, 2022

(30) Foreign Application Priority Data
Feb. 14, 2019  (SE) .................... 1950178-2

(51) Int. Cl.
*H04B 7/02* (2018.01)
*H04B 7/06* (2006.01)
(Continued)

(52) U.S. Cl.
CPC .......... *H04B 7/0632* (2013.01); *H04B 7/043* (2013.01); *H04B 17/309* (2015.01)

(58) Field of Classification Search
CPC ..... H04B 7/0632; H04B 17/309; H04B 7/043
(Continued)

(56) References Cited

U.S. PATENT DOCUMENTS

| 2018/0227772 A1 | 8/2018 | Yu |
| 2020/0287604 A1* | 9/2020 | Gao ........................ H04B 7/08 |

(Continued)

FOREIGN PATENT DOCUMENTS

| WO | 2018064372 A1 | 4/2018 |
| WO | 2018204340 A1 | 11/2018 |

OTHER PUBLICATIONS

Swedish Search Report from corresponding Swedish Application No. 1950178-2, dated Oct. 1, 2019, 4 pages.
(Continued)

*Primary Examiner* — Zewdu A Kassa
(74) *Attorney, Agent, or Firm* — Tucker Ellis LLP (57) ABSTRACT

The present disclosure comprises a method performed by a wireless device, wherein the wireless device is configured to communicate, using a set of beams, with a network node of a wireless communication system. The method comprises receiving, on one or more receive beams, one or more downlink, DL, signals from the network node. The method comprises determining one or more DL measurement parameters based on the received one or more DL signals. The method comprises determining whether the one or more DL measurement parameters satisfy a criterion. The method comprises, when it is determined that at least one of the one or more DL measurement parameters does not satisfy a criterion, indicating to the network node a beam reciprocity parameter, wherein the beam reciprocity parameter indicates a qualitative measure of one or more transmission beams of the wireless device.

18 Claims, 6 Drawing Sheets

(51) Int. Cl.
  *H04B 17/309* (2015.01)
  *H04B 7/0426* (2017.01)
(58) Field of Classification Search
  USPC ............... 375/267, 260, 259, 219, 295, 316
  See application file for complete search history.

(56) References Cited

U.S. PATENT DOCUMENTS

2021/0013954 A1* 1/2021 Zhao ..................... H04L 5/0057
2022/0022053 A1* 1/2022 Kakishima ........... H04B 7/0628

OTHER PUBLICATIONS

Intel, "On Beam Correspondence Optionality," 3GPP TSG-RAN Plenary Meeting #82, RP-182495, Dec. 10-13, 2018, 9 pages.
Samsung, "WF on Beam Correspondence," 3GPP TSG RAN Meeting #82, RP-182853, Dec. 10-13, 2018, 4 pages.
Catt, "Discussion on DL beam correspondence," 3GPP TSG RAN Meeting #82; RP-182475, Dec. 10-13, 2018, 2 pages.
International Search Report and Written Opinion from corresponding International Application No. PCT/SE2020/050027, dated Apr. 17, 2020, 17 pages.
Sony et al., "Beam Correspondence remaining X and Y," 3GPP TSG-RAN WG4 Meeting #90bis; R4-1904237, Apr. 8-12, 2019, 6 pages.

* cited by examiner

METHODS FOR ESTABLISHING BEAM RECIPROCITY, RELATED WIRELESS DEVICES AND RELATED NETWORK NODES

The present disclosure pertains to the field of wireless communications. More specifically, the present disclosure relates to methods for establishing beam reciprocity, related wireless devices and related network nodes.

BACKGROUND

In $3^{rd}$ Generation Partnership Project, 3GPP systems, beam correspondence, BC, is part of the air interface with the capability signaling to indicate whether uplink beam sweeping is needed to achieve beam reciprocity (e.g. two-way beam reciprocity). Tx/Rx beam correspondence at a wireless device (e.g. a user equipment, UE) holds if at least one of the following is satisfied: i) UE is able to determine a UE Tx beam for the uplink transmission based on UE's downlink measurement on UE's one or more Rx beams; ii) UE is able to determine a UE Rx beam for the downlink reception based on TRP's indication based on uplink measurement on UE's one or more Tx beams.

Measurement errors may influence the actual capability and performance of determining best beams. To overcome the measurements errors, a capability parameter is set to indicate that UL beam sweep is always needed in order to fulfill BC. This may lead to an increased overhead.

SUMMARY

There is a need for further optimization of the beam management in various conditions affecting the communication between the wireless device and the network node.

Accordingly, there is a need for methods for establishing beam reciprocity, which mitigate, alleviate or address the shortcomings mentioned above and provide an improvement of the beam performance by adapting to the conditions affecting the communication between the wireless device and the network node.

The present disclosure comprises a method performed by a wireless device, wherein the wireless device is configured to communicate, using a set of beams, with a network node of a wireless communication system. The method comprises receiving, on one or more receive beams, one or more downlink, DL, signals from the network node. The method comprises determining one or more DL measurement parameters based on the received one or more DL signals. The method comprises determining whether the one or more DL measurement parameters satisfy a criterion. The method comprises, when it is determined that at least one of the one or more DL measurement parameters does not satisfy a criterion, indicating to the network node a beam reciprocity parameter, wherein the beam reciprocity parameter indicates a qualitative measure of one or more transmission beams of the wireless device.

Further, a wireless device is provided, the device comprising: an interface module, a memory module, and a processing module, wherein the wireless device is configured to perform any of the methods described herein.

The present disclosure further comprises a method, performed by a network node, wherein the network node is configured to communicate, using a set of beams, with a wireless device via a wireless communication system. The method comprises transmitting on one or more transmission beams and according to a corresponding BC capability parameter indicating that no uplink beam sweeping is needed, one or more downlink, DL, signals to the wireless device. The method comprises receiving a beam reciprocity parameter from the wireless device. The beam reciprocity parameter indicates a qualitative measure of one or more transmission beams of the wireless device.

Finally, a network device is provided, the network device comprising: an interface module, a memory module, and a processing module, wherein the wireless device is configured to perform any of the methods described herein.

It is an advantage of the present disclosure that the disclosed methods enable dynamically adapting beam management to the conditions of communication channel between the wireless device and the network node.

The disclosure advantageously provides in one or more embodiments an improvement of the performance of the uplink communication established using beam correspondence in situations when it is otherwise difficult for the wireless device to determine an appropriate transmission beam due to the conditions affecting the communication channel.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

As discussed in detail herein, the present disclosure relates to a wireless communication system (e.g. a mmWave wireless communication system).

The 3$^{rd}$ Generation Partnership Project, 3GPP, systems are to operate with Tx/Rx beam correspondence at the network node (e.g. gNB, and/or Transmission Reception point, TRP) and the wireless device, so called UE, according to the following rules.

Tx/Rx beam correspondence at TRP holds if at least one of the following is satisfied:
- TRP is able to determine a TRP Rx beam for the uplink reception based on UE's downlink measurement on TRP's one or more Tx beams.
- TRP is able to determine a TRP Tx beam for the downlink transmission based on TRP's uplink measurement on TRP's one or more Rx beams Tx/Rx beam correspondence at UE holds if at least one of the following is satisfied:
- UE is able to determine a UE Tx beam for the uplink transmission based on UE's downlink measurement on UE's one or more Rx beams.
- UE is able to determine a UE Rx beam for the downlink reception based on TRP's indication based on uplink measurement on UE's one or more Tx beams.

The 3$^{rd}$ Generation Partnership Project, 3GPP, system provides that beam correspondence is mandatory with the capability signaling definition as follows. For example, a UE that fulfills the beam correspondence requirement without the uplink beam sweeping is to set the BC capability bit to 1. For example, a UE or wireless device that fulfills the beam correspondence requirement with the uplink beam sweeping is to set the BC capability bit to 0.

Measurement errors may influence the actual capability and performance of determining best beams. To overcome the measurements errors, a BC capability parameter is set to indicate that UL beam sweep is always needed (e.g. BC capability set to 0) in order to fulfill BC. This leads to an increased overhead which can be avoided by the disclosed technique.

The BC capability bit can be interpreted as providing a good BC performance versus a poor BC performance. There are several factors causing measurement errors affecting the performance of the communication using BC. Some factors are directly related to implementations issues in the hardware, HW design (e.g. different antenna elements or configurations are possible for UL/DL). Other factors may relate to implementation of algorithms (e.g. SW defining different antenna configurations (beam shapes) for UL/DL). There are also environmental factors, e.g. Signal to Noise Ratio, SNR, in DL synchronization signal (e.g. a Synchronization Signal Block, SSB and/or a Channel State Information Reference Signal, CSI-RS), and/or e.g. in an interference situation (SINR) seen by the network node or the UE. Environmental factors make it hard for the UE to estimate optimal rx-beam (and can therefore cannot determine what tx-beam is the best) even if HW/SW allows BC to be used.

BC performance is affected by dynamic factors, such as noise and interference affecting the communication between a wireless device and a network node. A static BC capability signaled to the network node may lead to a sub-optimal BC performance.

The present disclosure proposes to identify poor conditions and to adjust selected transmission beams based on the conditions or factors affecting the communication between the wireless device and the network node by indicating to the network node a beam reciprocity parameter when the communication between the wireless device and the network node is negatively affected (e.g. even when the BC capability parameter is set to indicate that UL beam sweep is not needed).

The figures are schematic and simplified for clarity, and they merely show details which are essential to the understanding of the invention, while other details have been left out. Throughout, the same reference numerals are used for identical or corresponding parts.

Figure 1A:
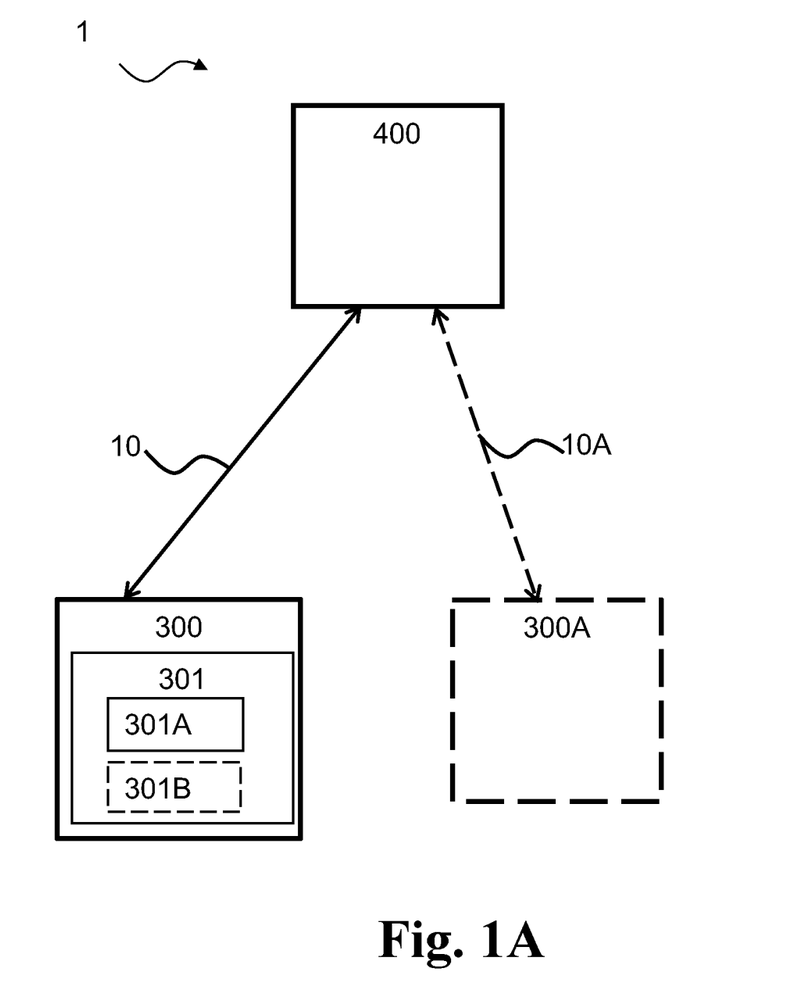
FIG. 1A is a diagram illustrating an exemplary wireless communication system comprising an exemplary network node and an exemplary wireless device according to this disclosure.

FIG. 1A is a diagram illustrating an exemplary wireless communication system 1 comprising an exemplary network node 400 and an exemplary wireless device 300 according to this disclosure.

As discussed in detail herein, the present disclosure relates to a wireless communication system 1 comprising a cellular system, e.g. a 3GPP wireless communication system, e. g. a millimetre-wave communications system. The wireless communication system 1 comprises a wireless device 300 and/or a network node 400.

The wireless device 300 is configured to communicate with a network of the wireless communication system 1 via a network node 400.

A network node disclosed herein refers to a radio network node, such as a radio access network node operating in the radio access network, such as a base station, an evolved Node B, eNB, gNB. The network node may comprise a transmission reception point, TRP. In one or more embodiment, the network node may comprise a plurality of TRPs. Example of network nodes include a panel, an access point and a different UE (e.g. in case of side link).

The wireless communication system 1 described herein may comprise one or more wireless devices 300, 300A, and/or one or more network nodes 400, such as one or more of: a base station (BS), an eNB, a gNB and/or an access point.

A network node may refer to an entity of a wireless network of the wireless communication system, used for establishing and controlling an air interface for communication with one or more wireless devices.

A wireless device may refer to as one or more of: a mobile device, a mobile or stationary computer, a tablet, a smart wearable device, and a smart phone device. In specifications under 3GPP, a wireless device is generally referred to as a user equipment, UE.

The wireless device 300, 300A may be configured to communicate with the network node 400 via a wireless link (or radio access link) 10, 10A.

For example, the wireless device 300 is configured to determine a Tx beam for the uplink transmission based on downlink measurement on one or more Rx beams of the wireless device.

The wireless device 300 comprises a wireless interface 301 comprising an antenna panel 301A and optionally an additional antenna panel 301B. An antenna panel may comprise one or more antenna elements, e.g. one or more antenna arrays.

Figure 1B:
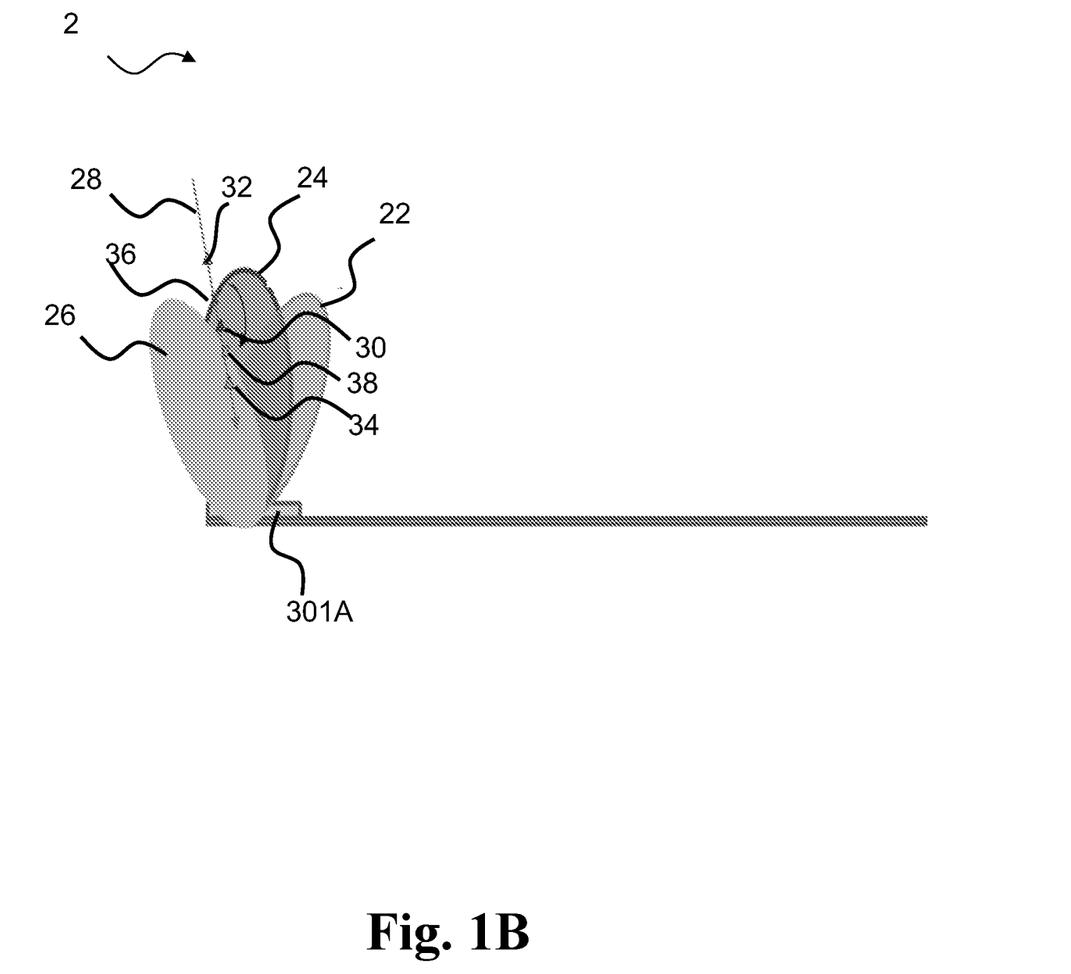
FIG. 1B is a diagram illustrating example beams of a wireless device leading to sub-optimal BC performance.

FIG. 1B is a diagram 2 illustrating example beams of a wireless device leading to sub-optimal BC performance. FIG. 1B illustrates an incorrect decision regarding beam direction made by the wireless device.

BC capability signalling is used to indicate whether or not the wireless device needs uplink beam sweeping in order to fulfil BC requirement. In other words, If the network node determines that a beam does not satisfy the BC requirement, the network node may request UL beam sweep and/or adjust power control and/or re-schedule. Based on the UL beam sweep, the network node helps the wireless device to select an optimal UL beam. The ability for the wireless device to determine an appropriate (e. g. correct, e.g. well-performing) beam direction is based on measurements of the downlink, DL synchronization signal (SSB or CSI-RS).

According to 3GPP specification TS 38.2144: "For the purpose of SS-RSRP, SS-RSRQ and SS-SINR measurements, the UE may assume downlink EPRE is constant across the bandwidth. For the purpose of SS-RSRP, SS-RSRQ and SS-SINR measurements, the UE may assume downlink EPRE is constant over SSS carried in different SS/PBCH blocks".

There is thus no reason for the wireless device to assume different Energy Per Resource Element, EPRE and thus, ideally and without any noise or interference the wireless device may be capable of correctly determining the strongest UE beam and thus correctly determining the correct spatial filter (e.g. beam) to be used for the subsequent communication. However, in non-ideal situation as explained above, various factors may have the determination and an incorrect decision on the beam may be done by the wireless device.

FIG. 1B shows an example of an incorrect decision made by the wireless device comprising an antenna or antenna panel 301A. The antenna 301A radiates a first beam 22, a second beam 24 and a third beam 26. In this example, the measurement with measurement angle 28 is associated with an error which may be related to e.g. added noise or interference. In FIG. 1B, 38 represents the measurement (e.g. an antenna gain, and/or Effective Isotropic Radiated Power, EIRP) assuming no noise or interference. 32 represents the value (e.g. measured received signal strength) determined by the wireless device including noise or interference. In this example, it is assumed the wireless device has a fixed codebook, i.e. the wireless device has to choose a beam among a set of pre-determined beams 22, 24, 26 and none of the beams is pointing perfectly to the network node. An appropriate or optimal beam, in this example, is the second beam 24 with a measured received signal strength 30 and antenna gain 36. However, due to the added noise in the measurement, the measurement of the third beam 26 determines the highest value as shown by 32. Consequently, the wireless device fails to choose the truly appropriate or optimal beam. The present disclosure addresses, inter alia, in one or more embodiment the suboptimal determination of beam correspondence illustrated in this example.

A quality of the measurement on the DL synchronization signal may also be based on factors such as HW implementation of the measurement receiver of the wireless device. Another factor leading to a suboptimal determination on UL beam based on DL synchronization signal may e.g. be a mismatch between DL and UL precoders (i.e. beam formers). There may be an uncertainty due to implementation, which may be constant over time.

As described above the quality of the measurement of the DL synchronization signal and thus the quality of the estimation on the optimal, appropriate or correct UL spatial filter (i.e. beam) depends on the noise in the measurements and thus the SNR of the DL synchronization signal, as well as the interference situation seen by the wireless device. Since neither the SNR nor the interference situation can be regarded as static, the present disclosure provides a dynamic beam reciprocity parameter to signal a performance measure of the transmission beams of the wireless device.

For example, it may be appreciated that the present disclosure proposes to enable, in one or more embodiments, by a beam reciprocity parameter indicated to the network node, an UL beam sweeping based on measurements of the DL synchronization signal and/or the interference situation seen by the network node. In the example of FIG. 1B, it is shown that for low SNR in the DL signal (i.e. noise level is high) the estimation of correct spatial filter for the UL is poor if based only on DL measurements. The wireless device disclosed herein may in one or more embodiment indicate to the network node with the beam reciprocity parameter that UL beam sweep is necessary in order to estimate the UL spatial filter with good quality in the estimation.

Assessing beam performance may be part of a continuous process to manage the beams in mobility scenarios. For example, the following process may take place: 1) BS have BC capability parameter, 2) BS sweeps DL tx-beams, 3) UE sweeps rx-beams, 4) The strongest beam of the UE is selected amongst the rx-beams swept—we have DL beam reciprocity, 5) Based on an assumed UE BC capability parameter, the UE selects the same UL tx-beam and 6) if the UE successfully transmits (e.g. hits) the BS (on its rx beam)—we have beam reciprocity also in the UL. 7) If 6) fails, UL beam sweeping is initiated by BS or UE.

For example, in step 4, if the SINR becomes low, the wireless device disclosed herein indicates a beam reciprocity parameter signals to the network node to indicate a poor qualitative measure of one or more transmission beams of the wireless device.

Figure 2:
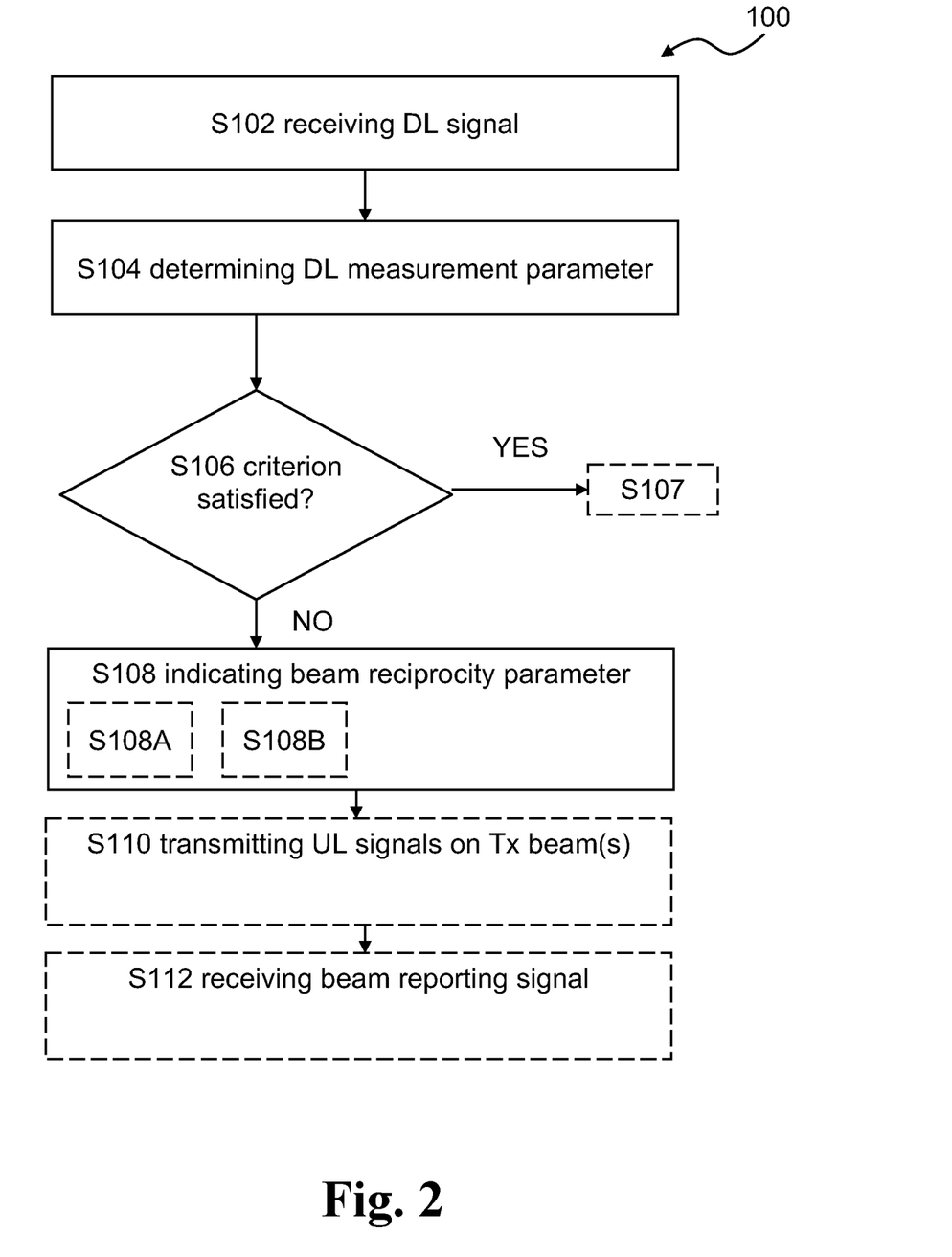
FIG. 2 is a flow-chart illustrating an exemplary method, performed in a wireless device, for beam reciprocity with a network node of a wireless communication system according to this disclosure.

FIG. 2 shows a flow diagram of an example method 100 performed by a wireless device according to the disclosure.

The method 100 is performed for establishing a beam reciprocity, such as for improving the beam reciprocity, such as for improving beam management.

The wireless device is configured to communicate, using a set of beams, with a network node via a wireless communication system (e.g. a mmWave wireless communication system). A beam may be formed resulting from beamforming of antenna patterns at the wireless device and/or at the network node. A beam may be formed at either side independently. When two beams point to each-other, beam reciprocity (BR) is achieved. For example, when UL and DL beam is the same at one side, e.g. at an entity (e.g. wireless device or network node), then the side or entity has BC. When the wireless device beam and the network node beam in either UL or DL finds each other, beam reciprocity is achieved.

In other words, beam reciprocity relates to alignment of the rx-beam and tx-beam in either UL or DL (e.g. how aligned are the Tx beam of UE with the rx-beam of the BS).

The method 100 comprises receiving S102, on one or more receive beams, one or more downlink, DL, signals from the network node. The one or more receive beam (e.g. rx-beams) may be configured with BC capability parameter indicating that no UL beam sweeping is needed to fulfil the BC requirement.

The method 100 comprises determining S104 one or more DL measurement parameters based on the received one or more DL signals. The one or more measurement parameters may be indicative of the radio or channel conditions and/or indicative of hardware noise. The one or more measurement parameters may comprise SNR signal-to-noise-ratio, and/or SINR signal-to-interference-and-noise-ratio. For example, despite BC capability parameter indicating that no UL beam sweeping is needed to fulfil the BC requirement, DL measurement parameters may be indicative of a poor performance of the corresponding beam.

The method 100 comprises determining S106 whether the one or more DL measurement parameters satisfy a criterion. In one or more example methods, the criterion comprises at least one threshold. In other words, determining whether the one or more downlink measurement parameter satisfy the criterion may comprise determining whether the one or more downlink measurement parameter is below the threshold. The criterion may be based on a direction, and/or a beam ranking based on detected signal strength. For example, the one or more DL measurement parameters may be indicative of a poor performance of the corresponding beam when the one or more downlink measurement parameter is below the threshold.

The method 100 comprises, when it is determined that at least one of the one or more DL measurement parameters does not satisfy a criterion, indicating S108 to the network node a beam reciprocity parameter, wherein the beam reciprocity parameter indicates a qualitative measure of one or more transmission beams of the wireless device. Stated differently, the beam reciprocity parameter indicates a qualitative measure of the performance of the one or more transmission beams of the wireless device. For example, the beam reciprocity parameter may indicate poor performance of the one or more transmission beams of the wireless device when at least one of the one or more DL measurement parameters does not satisfy the criterion. When performance is poor for a transmission beam, the BC cannot be guaranteed (e.g. the BC requirement is not fulfilled even if the BC capability parameter indicates that BC requirement is fulfilled without UL beam sweeping).

The beam reciprocity parameter may indicate a BC property. For example, beam reciprocity parameter at the wireless device may indicate performance or quality measure of a UE tx-beam for the UL transmission based on UE's DL measurement on UE's one or more rx-beams.

As explained above, the DL measurement parameters are affected by various factors, which may lead to measurement errors and lead to the DL measurement parameters not satisfying the criterion, this sub-optimal situation is to be indicated by the wireless device to the network node by the beam reciprocity parameter disclosed herein. The beam reciprocity parameter may be indicative of measurement error or measurement uncertainty. The beam reciprocity parameter may be indicative of quality measure indicating a poor or sub-optimal performance of the one or more transmission beams of the wireless device.

Indicating S108 to the network node the beam reciprocity parameter may comprise implicitly indicating the beam reciprocity parameter to the network node e.g. by using a pre-existing signal or message.

For example, the beam reciprocity parameter may be implicit by performing UL beam sweeping or by using available resources. Indicating S108 the UL beam sweeping may comprise generating S108B the UL beam sweeping. The wireless device thereby indicates that the transmission beam is not of sufficient quality to allow the wireless device to communicate with satisfactory performance. The wireless device may perform DL measurements. For example, from the DL measurements, the wireless device determines whether an UL beam sweep is needed for good quality in UL spatial filter or not. For example, if it is determined that UL beam sweep is needed, then the wireless device indicates to the network node the beam reciprocity parameter.

This may advantageously lead to a dynamic beam reciprocity based on current conditions of Rx/Tx between wireless device and network node including HW noise. Thus, this enables an improved UL communication.

In one or more example methods, the method comprises: when it is determined that at least one of the one or more DL measurement parameters satisfies a criterion, indicating S107 to the network node a positive beam reciprocity parameter indicative of satisfactory quality of the transmission beams of the wireless device.

In one or more example methods, indicating S108 the beam reciprocity parameter to the network node comprises transmitting S108A to the network node a control signal comprising the beam reciprocity parameter. For example, the control signal may indicate the beam reciprocity and indicates the need for radio resource management procedure from the network node (e.g. power control, re-scheduling, and/or UL beam sweep) or no action from the network node in order to maintain a satisfactory or good UL BR performance. For example, the control signal is based on the condition that the wireless device determines dynamically.

In one or more example methods, indicating S108 the beam reciprocity parameter comprises requesting UL beam sweeping to the network node.

In one or more example methods, the method 100 comprises transmitting S110, on the one or more device transmission beams, one or more UL signals to the network node. Transmitting S110 may take place in a link setup phase or in general when the link is broken or SINR degrades. A resources may be predefined for the wireless device to use if the wireless device needs them. If the UL resources are used by the wireless device, the network node detects this as a request. UL pilot resources may be associated with the DL beam and the network node is capable of determining what DL beam to use when DL transmissions. In one or more example methods, the method 100 comprises receiving S112 from the network node a beam reporting signal indicative of a transmission beam selected by the network node. In one or more example methods, a transmission beam is used for uplink transmission.

In one or more example methods, the one or more DL measurement parameters comprise one or more of: a signal to noise ratio, SNR, a signal to interference and noise ratio, SINR, and received signal strength. In one or more example methods, the one or more DL measurement parameters comprise a power ratio between DL receive beams. he one or more DL measurement parameters comprise input from sensors, e.g. proximity sensors and/or a radar echo. In one or more example methods, the one or more DL signals comprise one or more of: a synchronization signal and/or a reference signal.

A synchronization signal and/or a reference signal may for example include one or more of: a DL synchronization signal, SS, (e.g. a SS block SSB), or a Channel State information reference signal, CSI-RS. For example, for the purpose of SS-RSRP, SS-RSRQ and SS-SINR measurements, the UE may assume downlink EPRE is constant across the bandwidth. For the purpose of SS-RSRP, SS-RSRQ and SS-SINR measurements, the UE may assume downlink EPRE is constant over SSS carried in different SS/PBCH blocks.

In one or more example methods, the one or more UL signals comprise one or more of: a reference signal, a pilot signal, DeModulation, DM, reference signal. A reference signal may be e.g. a sounding reference signal, SRS.

Figure 3:
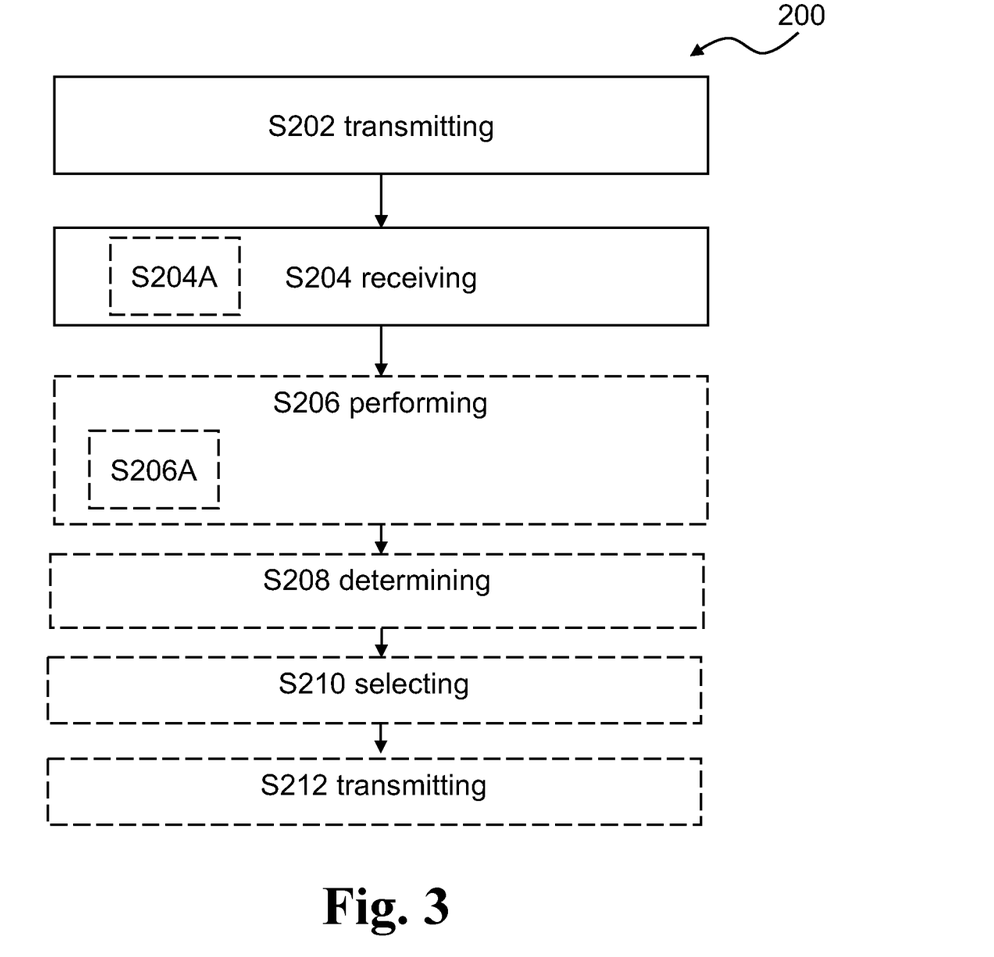
FIG. 3 is a flow-chart illustrating an exemplary method, performed in a network node of a wireless communication system, for beam reciprocity with a wireless device according to this disclosure.

FIG. 3 shows a flow diagram of an example method 200 performed by a network node according to the disclosure.

The network node is configured to communicate, using a set of beams, with a wireless device via a wireless communication system.

The method 200 comprises transmitting S202, on one or more transmission beams and according to a corresponding BC capability parameter indicating that no uplink beam sweeping is needed, one or more downlink, DL, signals to the wireless device. The method 200 comprises receiving (or detecting) S204 a beam reciprocity parameter from the wireless device, wherein the beam reciprocity parameter indicates a qualitative measure of one or more transmission beams of the wireless device (e.g. a qualitative measure indicating a poor or suboptimal performance of the one or more transmission beams of the wireless device).

Receiving S204 a beam reciprocity parameter from the wireless device, wherein the beam reciprocity parameter indicates a qualitative measure of one or more transmission beams of the wireless device, may comprise detecting UL beam sweeping. This may advantageously improve UL performances by allowing a better beam to be used for UL. In one or more embodiments, the beam reciprocity parameter indicates a qualitative measure of a UE tx-beam for the UL transmission selected based on UE's DL measurement on UE's one or more rx-beams, and/or Receiving S204 the beam reciprocity parameter may comprise determining S204A a radio resource management procedure. Radio resource management procedure comprises a power control procedure, a re-scheduling procedure, and/or an UL beam sweeping procedure.

In one or more example methods, the method 200 comprises performing S206 UL beam sweeping. In one or more example methods, performing S206 UL beam sweeping comprises receiving 5206A, on one or more receive beams, one or more UL signals from the wireless device. For example, the network node may use multiple of rx-beams for a sweep in a multiplexed manner to receive the UL signals transmitted from each of multiple tx-beams in each direction. For example, the network node side may provide resources to measure beamformed channel of different combinations of beams from the network node and beams of the wireless device (e.g. in a multiplexed manner). For example, the network node performs periodic beam sweeping by receiving UL reference signal(s) carried on individual tx-beams of the wireless device. For example, the network node can determine one or more UL measurement parameters by using different rx-beams, and select an optimal tx-beam of the wireless device and inform the wireless device accordingly of the optimal tx-beam or of the measurement results.

In one or more example methods, the method 200 comprises determining S208 one or more UL measurement parameters based on the received one or more UL signals. The UL measurements parameter include e.g. power measurement, SNR, and/or SINR.

In one or more example methods, the method 200 comprises selecting S210 one or more transmission beams based on the one or more UL measurement parameters. In one more example methods, a transmission beam is used or intended for uplink transmission.

In one or more example methods, the method 200 comprises transmitting S212 to the wireless device a beam reporting signal indicative of one or more transmission beams selected by the network node. The beam reporting signal may comprise a list of UL beam identifiers corresponding to selected one or more tx-beams to be used by the wireless device. Alternatively, each UL tx-beam have associated resources and the network node may address the strongest beam by transmission in the associated resources.

In one or more example methods, the one or more DL signals comprise one or more of: a synchronization signal and/or a reference signal.

In one or more example methods, the one or more UL signals comprise a reference signal.

Figure 4:
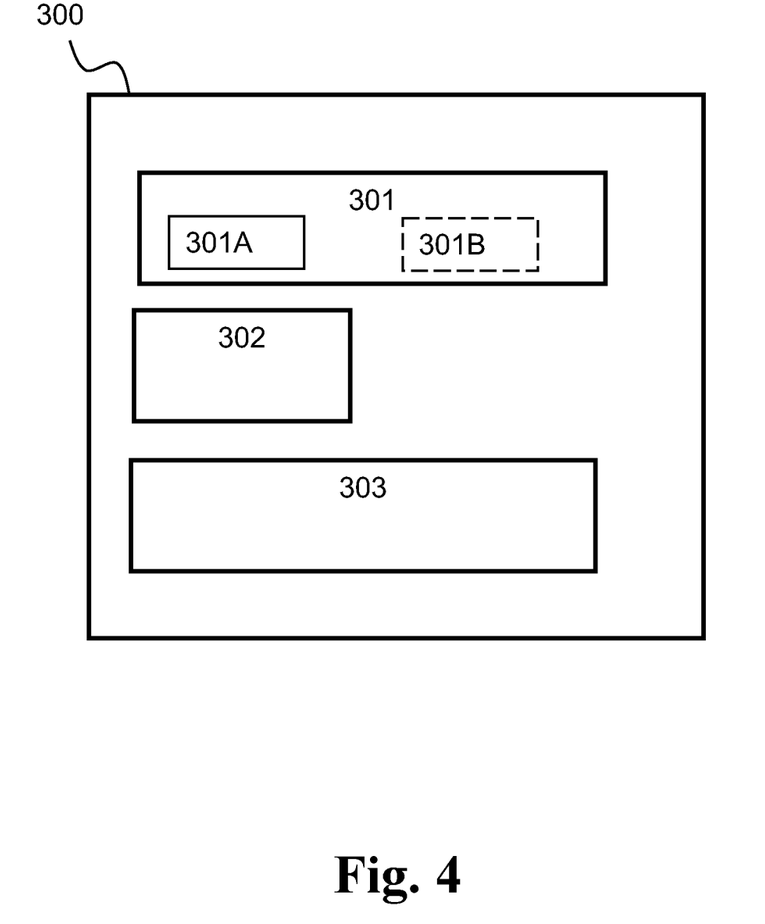
FIG. 4 is a block diagram illustrating an exemplary wireless device according to this disclosure.

FIG. 4 shows a block diagram of an example wireless device 300 according to the disclosure. The wireless device 300 comprises a wireless interface 301, a processor module 303, and a memory module 302. The wireless interface 301 comprises an antenna or antenna panel 301A. The wireless interface 301 may comprise a plurality of antenna panels including a first antenna panel 301A and a second antenna panel 301B. The wireless device 300 may be configured to perform any of the methods disclosed in FIG. 2.

The wireless device 300 is configured to communicate with a network node, such as network node 400 disclosed herein, using a wireless communication system (as illustrated in FIG. 1). The wireless interface 301 is configured to communicate with the network node via a wireless communication system, such as a 3GPP system, such as millimetre-wave communication system.

The wireless device 300 is configured to, via the wireless interface 301, receive, on one or more receive beams, one or more downlink, DL, signals from the network node.

The wireless device 300 is configured to, via the processor module 303, to determine one or more DL measurement parameters based on the received one or more DL signals.

The wireless device 300 is configured to, via the processor module 303, to determine whether the one or more DL measurement parameters satisfy a criterion; and when it is determined that at least one of the one or more DL measurement parameters does not satisfy a criterion, to, via the wireless interface 301, indicate to the network node a beam reciprocity parameter disclosed herein.

The processor module 303 is optionally configured to perform any of the operations disclosed in FIG. 2, e.g. S107, S108, S108A, S108B, S110, S112. The operations of the wireless device 300 may be embodied in the form of executable logic routines (e.g., lines of code, software programs, etc.) that are stored on a non-transitory computer readable medium (e.g., the memory module 302) and are executed by the processor module 303).

Furthermore, the operations of the wireless device 300 may be considered a method that the wireless module is configured to carry out. Also, while the described functions and operations may be implemented in software, such functionality may as well be carried out via dedicated hardware or firmware, or some combination of hardware, firmware and/or software.

The memory module 302 may be one or more of a buffer, a flash memory, a hard drive, a removable media, a volatile memory, a non-volatile memory, a random access memory (RAM), or other suitable device. In a typical arrangement, the memory module 302 may include a non-volatile memory for long term data storage and a volatile memory that functions as system memory for the processor module 303. The memory module 302 may exchange data with the processor module 304 over a data bus. Control lines and an address bus between the memory module 302 and the processor module 303 also may be present (not shown in FIG. 3). The memory module 302 is considered a non-transitory computer readable medium.

Figure 5:
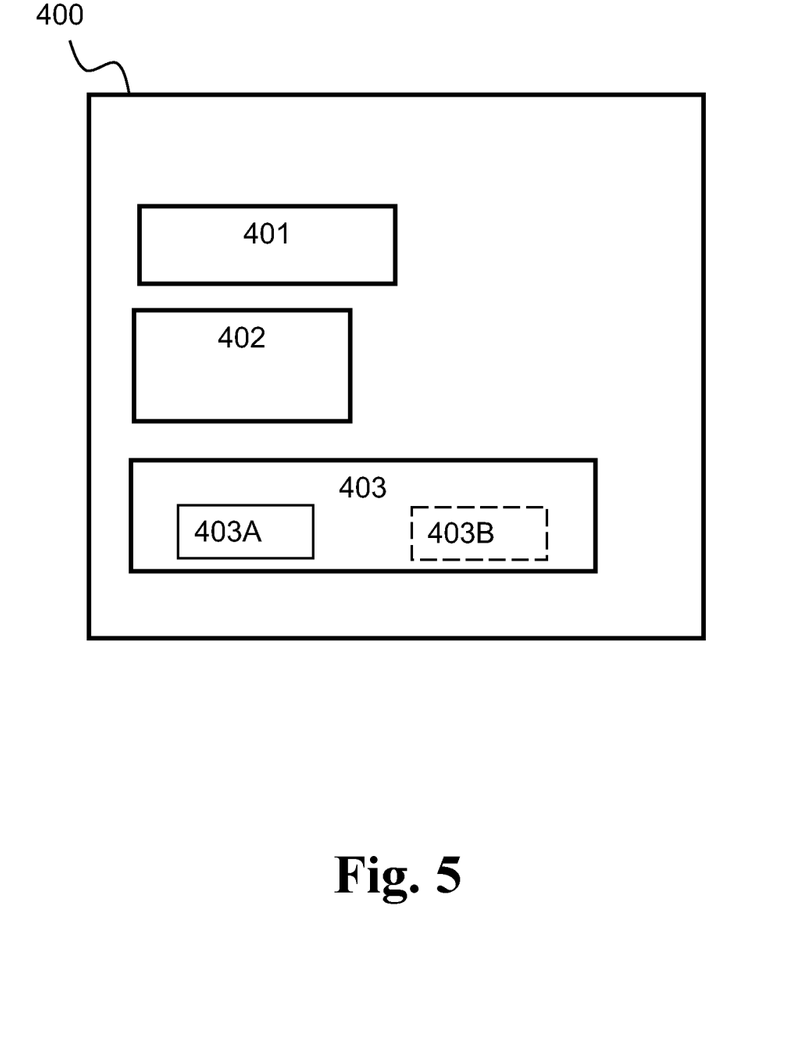
FIG. 5 is a block diagram illustrating an exemplary network node according to this disclosure.

FIG. 5 shows a block diagram of an exemplary network node 400 according to the disclosure. The network node 400 comprises a memory module 401, a processor module 402, and a wireless interface 403. The wireless interface 403 comprises an antenna or antenna panel. The wireless interface may comprise a plurality of antenna panels. The network node 400 may be configured to perform any of the methods disclosed in FIG. 3.

The network node 400 is configured to communicate with a wireless device, such as wireless device 300 disclosed herein, using a wireless communication system (as illustrated in FIG. 1). The wireless interface 403 is configured to communicate with the wireless device via a wireless communication system, such as a 3GPP system, such as millimetre-wave communication system. The wireless interface 403 may comprises one or more antenna panels 403A, 403B.

The network node 400 is configured to, via the wireless interface 403, transmit, on one or more transmission beams and according to a corresponding BC capability parameter indicating that no uplink beam sweeping is needed, one or more downlink, DL, signals to the wireless device.

The network node 400 is configured to, via the wireless interface 403, receive a beam reciprocity parameter from the wireless device, wherein the beam reciprocity parameter indicates a qualitative measure of one or more transmission beams of the wireless device (e.g. a qualitative measure indicating a poor or suboptimal performance of the one or more transmission beams of the wireless device).

The processor module 402 is optionally configured to perform any of the operations disclosed in FIG. 3, e.g. S204A, S206, 5206A, S208, S210, S212. The operations of the network node 400 may be embodied in the form of executable logic routines (e.g., lines of code, software programs, etc.) that are stored on a non-transitory computer readable medium (e.g., the memory module 401) and are executed by the processor module 402).

Furthermore, the operations of network node 400 may be considered a method that the wireless device is configured to carry out. Also, while the described functions and operations may be implemented in software, such functionality may as well be carried out via dedicated hardware or firmware, or some combination of hardware, firmware and/or software.

The memory module 401 may be one or more of a buffer, a flash memory, a hard drive, a removable media, a volatile memory, a non-volatile memory, a random access memory (RAM), or other suitable device. In a typical arrangement, the memory module 401 may include a non-volatile memory for long term data storage and a volatile memory that functions as system memory for the processor module 402. The memory module 401 may exchange data with the processor module 402 over a data bus. Control lines and an address bus between the memory module 401 and the processor module 402 also may be present (not shown in FIG. 5). The memory module 401 is considered a non-transitory computer readable medium.

Embodiments of methods and products (network node and wireless device) according to the disclosure are set out in the following items:

1. A method for establishing beam reciprocity, performed by a wireless device, wherein the wireless device is configured to communicate, using a set of beams, with a network node of a wireless communication system, the method comprising:

receiving (S102), on one or more receive beams, one or more downlink, DL, signals from the network node;

determining (S104) one or more DL measurement parameters based on the received one or more DL signals;

determining (S106) whether the one or more DL measurement parameters satisfy a criterion; and when it is determined that at least one of the one or more DL measurement parameters does not satisfy a criterion, indicating (S108) to the network node a beam reciprocity parameter, wherein the beam reciprocity parameter indicates a qualitative measure of one or more transmission beams of the wireless device.

2. The method according to item 1, wherein indicating (S108) to the network node the beam reciprocity parameter comprises transmitting (S108A) to the network node a control signal comprising the beam reciprocity parameter.

3. The method according to any of items 1-2, wherein indicating (S108) to the network node the beam reciprocity parameter comprises generating (S108B) an uplink, UL, beam sweeping.

4. The method according to any of the previous items, the method comprising:

transmitting (S110), on the one or more transmission beams, one or more UL signals to the network node;

receiving (S112) from the network node a beam reporting signal indicative of a transmission beam selected by the network node or indicative of a beam correspondence, BC.

5. The method according to any of the previous items, wherein the one or more DL measurement parameters comprise one or more of: a signal to noise ratio, SNR, a signal to interference and noise ratio, SINR, and/or a received signal strength.

6. The method according to any of the previous items, wherein the one or more DL signals comprise one or more of: a synchronization signal and/or a reference signal.

7. The method according to any of items 4-6, wherein the one or more UL signals comprise a reference signal.

8. The method according to any of the previous items, wherein the criterion comprises at least one threshold.

9. A method, performed by a network node, wherein the network node is configured to communicate, using a set of beams, with a wireless device via a wireless communication system, the method comprising:

transmitting (S202), on one or more transmission beams and according to a corresponding BC capability parameter indicating that no uplink, UL, beam sweeping is needed, one or more downlink, DL, signals to the wireless device; and receiving (S204) a beam reciprocity parameter from the wireless device, wherein the beam reciprocity parameter indicates a qualitative measure of one or more transmission beams of the wireless device.

10. The method according to item 9, wherein receiving (S204) the beam reciprocity parameter comprises determining (S204A) a radio resource management procedure.

11. The method according to item 10, wherein the radio resource management procedure determined is the UL beam sweeping, the method comprising performing (S206) the UL beam sweeping on one or more receive beams.

12. The method according to item 11, wherein performing (S206) the UL beam sweeping on the one or more receive beams comprises:

receiving (S206A), on the one or more receive beams, one or more UL signals from the wireless device.

13. The method according to item 12, the method comprises:

determining (S208) one or more UL measurement parameters based on the received one or more UL signals; and selecting (S210) the one or more transmission beams based on the one or more UL measurement parameters.

14. The method according to item 13, the method comprises transmitting (S212) to the wireless device a beam reporting signal indicative of the one or more transmission beams selected by the network node.

15. The method according to any of items 9-14, wherein the one or more DL signals comprise one or more of: a synchronization signal and/or a reference signal.

16. The method according to any of items 12-15, wherein the one or more UL signals comprise a reference signal.

17. A wireless device comprising an interface module, a memory module, and a processing module, wherein the wireless device is configured to perform any of the methods according to any of items 1-8.

18. A network node comprising an interface module, a memory module, and a processing module, wherein the network node is configured to perform any of the methods according to any of items 9-16.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-5 comprises some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications, and equivalents.

The invention claimed is:

1. A method for establishing beam reciprocity of a wireless device, performed by the wireless device, wherein the wireless device is configured to communicate, using a set of beams, with a network node of a wireless communication system, the method comprising:
   receiving, on one or more receive beams, one or more downlink, DL, signals from the network node;
   determining one or more DL measurement parameters based on the received one or more DL signals;
   determining whether the one or more DL measurement parameters satisfy a criterion; and
   when it is determined that at least one of the one or more DL measurement parameters does not satisfy a criterion, indicating to the network node a beam reciprocity parameter, wherein the beam reciprocity parameter indicates a qualitative measure of one or more transmission beams of the wireless device.

2. The method according to claim 1, wherein indicating to the network node the beam reciprocity parameter comprises transmitting to the network node a control signal comprising the beam reciprocity parameter.

3. The method according to claim 1, wherein indicating to the network node the beam reciprocity parameter comprises generating an uplink, UL, beam sweeping.

4. The method according to claim 1, the method comprising:
   transmitting, on the one or more transmission beams, one or more UL signals to the network node;
   receiving from the network node a beam reporting signal indicative of a transmission beam selected by the network node or indicative of a beam correspondence, BC.

5. The method according to claim 1, wherein the one or more DL measurement parameters comprise one or more of: a signal to noise ratio, SNR, a signal to interference and noise ratio, SINR, and/or a received signal strength.

6. The method according to claim 1, wherein the one or more DL signals comprise one or more of: a synchronization signal and/or a reference signal.

7. The method according to claim 4, wherein the one or more UL signals comprise a reference signal.

8. The method according to claim 1, wherein the criterion comprises at least one threshold.

9. A method, performed by a network node, wherein the network node is configured to communicate, using a set of beams, with a wireless device via a wireless communication system, the method comprising:
   transmitting, on one or more transmission beams and according to a corresponding BC capability parameter indicating that no uplink, UL, beam sweeping is needed, one or more downlink, DL, signals to the wireless device; and
   receiving a beam reciprocity parameter from the wireless device, wherein the beam reciprocity parameter indicates a qualitative measure of one or more transmission beams of the wireless device, and the beam reciprocity parameter is related to the beam reciprocity of the wireless device.

10. The method according to claim 9, wherein receiving the beam reciprocity parameter comprises determining a radio resource management procedure.

11. The method according to claim 10, wherein the radio resource management procedure determined is UL beam sweeping, the method comprising performing the UL beam sweeping on one or more receive beams of the network node.

12. The method according to claim 11, wherein performing the UL beam sweeping on the one or more receive beams comprises:
  receiving, on the one or more receive beams, one or more UL signals from the wireless device.

13. The method according to claim 12, the method comprises:
  determining one or more UL measurement parameters based on the received one or more UL signals; and
  selecting the one or more transmission beams based on the one or more UL measurement parameters.

14. The method according to claim 13, the method comprises transmitting to the wireless device a beam reporting signal indicative of the one or more transmission beams selected by the network node.

15. The method according to claim 9, wherein the one or more DL signals comprise one or more of: a synchronization signal and/or a reference signal.

16. The method according to claim 12, wherein the one or more UL signals comprise a reference signal.

17. A wireless device comprising an interface module, a memory module, and a processing module, wherein the wireless device is configured to perform the method of claim 1.

18. A network node comprising an interface module, a memory module, and a processing module, wherein the network node is configured to perform the method of claim 9.

* * * * *